United States Patent
Colucci et al.

(10) Patent No.: US 7,134,427 B2
(45) Date of Patent: Nov. 14, 2006

(54) DELIVERY OF ORGANOMOLYBDENUM VIA VAPOR PHASE FROM A LUBRICANT SOURCE INTO A FUEL COMBUSTION SYSTEM

(75) Inventors: William J. Colucci, Glen Allen, VA (US); Allen A. Aradi, Richmond, VA (US); Cheng C. Kuo, Midlothian, VA (US)

(73) Assignee: Afton Chemical Intangibles LLC, Richmond, VA (US)

( * ) Notice: Subject to any disclaimer, the term of this patent is extended or adjusted under 35 U.S.C. 154(b) by 109 days.

(21) Appl. No.: 10/443,291

(22) Filed: May 22, 2003

(65) Prior Publication Data

US 2004/0231632 A1 Nov. 25, 2004

(51) Int. Cl.
*F02B 25/06* (2006.01)
(52) U.S. Cl. .................. 123/572; 123/574; 123/274
(58) Field of Classification Search .............. 123/572, 123/574, 294
See application file for complete search history.

(56) References Cited

U.S. PATENT DOCUMENTS

| | | | |
|---|---|---|---|
| 3,578,690 A | 5/1971 | Becker | |
| 4,164,473 A | 8/1979 | Coupland et al. | |
| 4,360,438 A | 11/1982 | Rowan et al. | |
| 4,765,918 A | 8/1988 | Love et al. | |
| 4,889,647 A | 12/1989 | Rowan et al. | |
| 4,992,187 A * | 2/1991 | Adams et al. | 508/179 |
| 5,137,647 A | 8/1992 | Karol | |
| 5,205,265 A | 4/1993 | Kashiyama et al. | |
| 5,412,130 A | 5/1995 | Karol | |
| 5,445,759 A | 8/1995 | Powell | |
| 5,546,915 A * | 8/1996 | Isobe | 123/568.12 |
| 5,628,802 A | 5/1997 | Karol et al. | |
| 5,840,672 A | 11/1998 | Gatto | |
| 6,017,858 A | 1/2000 | Karol et al. | |
| 6,103,674 A | 8/2000 | Nalesnik et al. | |
| 6,174,842 B1 | 1/2001 | Gatto et al. | |
| 6,300,291 B1 | 10/2001 | Hartley et al. | |
| 6,369,005 B1 | 4/2002 | Karol et al. | |
| 6,408,835 B1 * | 6/2002 | Katayama et al. | 123/572 |
| 6,509,303 B1 | 1/2003 | Gatto | |
| 6,528,461 B1 | 3/2003 | Mike et al. | |
| 6,528,463 B1 * | 3/2003 | Gatto et al. | 508/367 |
| 6,550,444 B1 * | 4/2003 | Shiraishi et al. | 123/294 |

FOREIGN PATENT DOCUMENTS

| | | |
|---|---|---|
| EP | 0737735 A2 * | 10/1996 |
| EP | 1 041 134 A2 | 10/2000 |
| EP | 1 136 496 A1 | 9/2001 |
| EP | 0 874 040 B1 | 7/2002 |
| GB | 471292 | 9/1927 |

(Continued)

OTHER PUBLICATIONS http://www.hastingsfilter.com/engineering/tsb_94-2r.html.*

(Continued)

*Primary Examiner*—Thomas Denion
*Assistant Examiner*—Zelalem Eshete
(74) *Attorney, Agent, or Firm*—Dennis H. Rainear; Leah Qubre Robinson

(57) ABSTRACT

A method and combustion system for reducing the formation of intake manifold deposits, such as including intake valve valves, and exhaust valve deposits in combustion engines by delivery of an organomolybdenum source from the vapor phase of an engine lubricant into a combustion chamber.

22 Claims, 1 Drawing Sheet

FOREIGN PATENT DOCUMENTS

| | | |
|---|---|---|
| GB | 2 006 329 A | 5/1979 |
| JP | 04-301172 A | 10/1992 |
| JP | 2000290675 | 10/2000 |
| WO | WO 01/60959 A1 | 8/2001 |

OTHER PUBLICATIONS

Kelemen et al., Combustion Chamber Depositis from Base Fuel and Commercial IVD Detergent Packages, 1998, Society of Automotive Engineers, pp. 59-71.*

Kelemen et al., The Effects of Intake Valve Detergent Structure on Combustion Chamber Deposits, 1995, Society of Automotive Engineers, pp. 83-90.*

Clarke et al., The Relationship Between Gasoline Additive Thermal Stability and Combustion Chamber Deposits, 1997, Society of Automotive Engineers, pp. 63-69.*

Krause, Wolfgang; Spies, Karl H.; Bell, Laurence E.; and Ebert, Fritz; "Oil Separation in Crankcase Ventilation—New Concepts Through System Analysis and Measurements;"; Feb. 27-Mar. 2, 1995; SAE Technical Paper 950939 (reprinted from: Applications and Developments in New Engine Design and Components—SP-1071); SAE International Congress and Exposition; Detroit, Michigan.

Stipanovic, A.J.; Schoonmaker, J.P.; de Paz, E.F.; Mowlem, J.K.; Broas, J.E., Jr.; and Thiel, C.Y.; "Base Oil and Additive Effects in the Thermo-oxidation Engine Oil Simulation Test (TEOST);" Oct. 14-17, 1996; SAE Technical Paper 962038 (reprinted from: Subject in Engine Oil Rheology and Tribology—SP-1209); SAE International Fall Fuels & Lubricants Meeting & Exposition: San Antonio, Texas.

Selby, Theodore W.; Richardson, Jennifer; Florkowski, Dennis W.; "Engine Oil Deposits and the TEOST—Protocol 33 and Beyond;" Oct. 14-17, 1996; SAE Technical Paper 962039; SAE International Fall Fuels & Lubricants Meeting & Exposition; San Antonio, Texas.

* cited by examiner

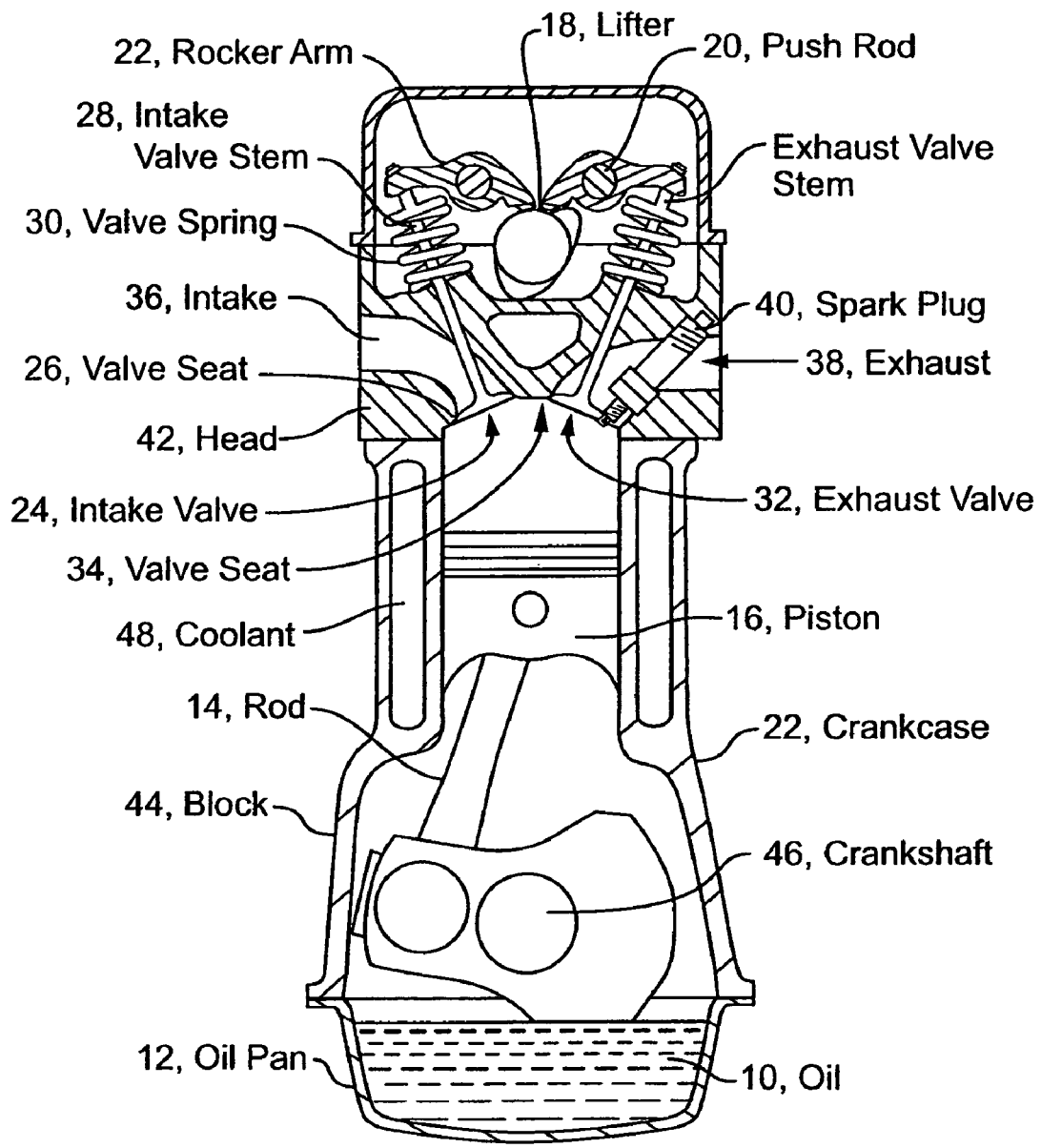

DELIVERY OF ORGANOMOLYBDENUM VIA VAPOR PHASE FROM A LUBRICANT SOURCE INTO A FUEL COMBUSTION SYSTEM

FIELD OF THE INVENTION

This invention relates to a method and combustion system for controlling deposits in the intake manifold including the intake valves of combustion engines by delivery of an organomolybdenum source from the vapor phase of an engine lubricant into a combustion chamber, in which reductions in the formation of deposits can be achieved at an intake manifold including intake valves, an exhaust valve, or both, of the combustion chamber.

BACKGROUND

Over the years considerable work has been devoted to developing additives for controlling (preventing or reducing) deposit formation in the fuel injection systems of spark-ignition internal combustion engines in particular. In particular, additives that can effectively control fuel injector deposits, intake valve deposits and combustion chamber deposits represent the focal point of considerable research activities in the field. Despite these efforts, further improvements and advances are needed to combat the deposit formation problem as will become more apparent from the following discussion.

In combustion engines using fuel injection systems, those systems operate by forcing fuel into an incoming stream of air. Computer-controlled injection systems measure engine operating conditions such as intake air volume, engine temperature, load and speed, and the make up of exhaust gas. The precise amount of fuel is then injected into the engine. There are several fuel injection systems, including throttle body and sequential multiport injection (MPI). In the throttle body systems, multiple cylinders share an injector. Sequential multiport injection (MPI) systems are more precise and efficient. Currently, they are the commonly used fuel injection system.

In a sequential multi-port injection system, a fuel injector is mounted in the cylinder head or the intake manifold immediately outside each cylinder and its associated intake valve. Each cylinder has its own dedicated fuel injector, which opens independently of the others and it is timed with the opening of the intake valve of the associated cylinder. A fuel pump feeds fuel from the gas tank to the fuel injection system where each fuel injector injects the fuel into the intake manifold of an associated cylinder. Each injector delivers a fuel/air mix prescribed by the power-train control module (PCM) at the right moment. The injected fuel/air mix first passes through an intake valve in an open position and then into the combustion chamber. In MPI's, the fuel/air mix is introduced into the cylinder in the form of a fine mist ready for combustion.

The above-described conventional port-fuel injection (PFI) engines form a homogeneous pre-mixture of gasoline and air by injecting gasoline into the intake port. By comparison, direct injection gasoline (DIG) engines inject gasoline directly into the combustion chamber, like a diesel engine. In this manner, it becomes possible in DIG engines to form a stratified fuel mixture, which contains greater than the stoichiometric amount of fuel in the neighborhood of the spark plug while being highly lean in the remainder of the combustion chamber. Due to the formation of such a stratified fuel mixture, combustion with the overall highly lean mixture can be achieved, leading to an improvement in fuel consumption over that of PFI engines, and approaching that of diesel engines. In DIG engines, like diesel engines, only air is introduced through the intake valve and not a fuel/air mixture like a PFI or MPI engine. However, unlike a diesel engine, spark plugs can be used to ignite the fuel. The fuel is often sprayed directly into the cylinders using a fuel injector. In more recent designs of DIG engines, the injector is often placed in the combustion chamber between the air intake and the exhaust valves.

However, both PFI and DIG engines have been subject to undesired fuel-related deposit problems, especially with respect to the injectors, the intake valves, and in the combustion chamber. In MPI systems, the intake valve may have some contact with a potential deposit-reducing detergent or other additive dispersed in the fuel/air mixture that passes through the intake valve. Nonetheless, these MPI engines experience intake valve deposit (IVD) build up, which ultimately can impair engine cleanliness and engine performance. DIG engines can have even greater IVD problems. In DIG systems in particular, the directly injected fuel does not get any opportunity to contact the intake valves before being introduced into the combustion chamber, so inclusion of a detergent in the fuel will be ineffectual to reduce deposits on the intake valve. Therefore, in these more recent implementations of DIG engine technology in particular, intake valve deposits can not be easily or adequately controlled from the fuel side. There is, therefore, a need for other strategies that might address the engine intake valve deposit problems outlined above.

Lubricating oils used in the internal combustion engines of automobiles or trucks are subjected to a demanding environment during use. Different types of additives have been added to such motor oils in efforts to enhance their performance. For instance, various molybdenum compounds have been used and proposed as performance-enhancing additives for lubricant compositions used as motor oils. There are numerous examples in the patent literature, which describe the use of molybdenum additives variously as antioxidants, deposit control additives, anti-wear additives and friction modifiers, in lubricant compositions. A partial list of such patent references includes, for example, U.S. Pat. Nos. 4,164,473, 5,840,672, 6,103,674, 6,174,842, and U.S. Reissued Pat. No. RE37,363E, among others.

U.S. Pat. No. 5,445,749 describes a method for lubricating metal-ceramic interfaces in hybrid engines by supplying a composition to the interface comprising a carrier fluid and a thiocarbamate, such as molybdenum dithiocarbamates. The carrier fluid is described as being a lubricating oil supplied from a sump, or alternatively a liquid fuel. U.S. Pat. No. 5,445,749 includes examples of compositions prepared of molybdenum dithiocarbamates in liquid fuel as the carrier fluid, and base oil and diluent oil are the only other indicated ingredients of those lubricated fuel compositions.

The addition of molybdenum compounds together with or without a metal-containing detergent to crankcase lubrication oils also has been described in the patent literature. U.S. Pat. No. 6,300,291 describes a lubricating oil composition for use in an engine crankcase to improve low temperature anti-wear performance and fuel economy containing an oil of lubricating viscosity, at least one calcium detergent providing calcium in an amount of 0.058 to 0.58 wt %, at least one soluble molybdenum compound providing Mo in amount of up to 350 ppm Mo, at least one nitrogen containing friction modifier, and at least one zinc dihydrocarbyldithiophosphate compound providing phosphorous in amount of about 0.1 wt %, where the composition has a NOACK volatility of about 15.5 wt % or less.

European Patent EP 0 874 040 B1 describes synergistic organomolybdenum antiwear compositions consisting of (a) an organomolybdenum complex prepared by reacting about 1 mole fatty oil, 1.0 to 2.5 moles diethanolamine and a molybdenum source sufficient to yield 0.1 to 12.0 percent of molybdenum based on the weight of the complex, and (b) an organic sulfur compound selected from the group consisting of 1,3,4-thiadiazole compounds of a specified formula. EP 0 874 040 B1 also describes lubricating compositions containing 0.1 to 10.0 percent by weight of the antiwear composition in combination with a major portion of oil of lubricating viscosity.

U.S. Pat. No. 6,528,463 describes a molybdenum complex for use in crankcase oil that is effective variously to improve oxidative stability and fuel economy, and reduce deposits and wear, in an internal combustion engine. The deposits that may be reduced are represented as being piston deposits, ring land deposits, crown land deposits and top land deposits.

U.S. Pat. Nos. 6,509,303 and 6,528,461 also describe organic soluble molybdenum complex additives and lubricating motor oils containing them.

A need remains for strategies that might reduce the occurrence of intake valve deposits in internal combustion engines.

SUMMARY OF EMBODIMENTS

In embodiments of the present invention, intake manifold and valve deposit reduction in an internal combustion engine is achieved by delivery of an organomolybdenum source from a vapor phase of an engine lubricant into the combustion chamber through its intake valve. In one aspect, valve deposit reduction in particular can be achieved at either or both of an intake valve and an exhaust valve of the combustion chamber.

Some embodiments of the present invention exploit any one or more of several pathways for introducing organomolybdenum source components from a vapor phase of a lubricating oil into the combustion system via its intake valve. In one embodiment, the cleanliness of the intake valves is brought about through an active agent derived in vapor phase from a crankcase lubricating oil containing an organomolybdenum source. In one aspect, the organomolybdenum source is entrained into the vapor phase of the lubricant and introduced to the combustion chamber by positive crankcase ventilation (PCV) gases, which pass into and through an intake manifold including an intake valve into the combustion chamber effective to control deposit build up on the intake manifold in general and the intake valve(s) in particular. Additionally or alternatively, the organomolybdenum source or combustion products thereof can be introduced through the intake valve into the combustion chamber via the exhaust gas recirculation (EGR) system. The term "control" as used herein in connection with valve deposits, refers to the prevention of formation of valve deposits and/or removal of existing valve deposit build up.

Embodiments of the present invention are widely applicable to all spark-ignition internal combustion engines, and more particularly are applicable, for example, to MPI engines and DIG engines.

The organomolybdenum source is present in the lubricant as an oil-soluble additive that is introduced into the vapor phase of the lubricant in the crankcase by at least one of the mechanisms of a) at least partial volatilization of the organomolybdenum source from the lubricant in the crankcase under engine running conditions sufficient to generate vapors of the organomolybdenum source, and/or b) fine droplets of the lubricant oil containing the organomolybdenum source as a constituent thereof are splashed or ejected as the fine droplets from the liquid phase into the vapor phase of the lubricant within the crankcase due to physical disturbances of the liquid phase oil by its dynamic contact with surfaces within the crankcase or with moving mechanical parts within the crankcase. The organomolybdenum source consequently becomes entrained into the vapor phase of the crankcase from which it is available to be routed into the combustion chamber through the combustion chamber's intake valve. The presence of the organomolybdenum source material obtained from the engine lubricant in the fuel/air or gas streams fed to the combustion chamber has been observed, quite surprisingly, to result in a reduction or prevention of the formation of valve deposits at the intake valve.

For purposes herein, "vapor phase" means a suspension of particles in air and/or gas(es), which can encompass suspended visible or invisible, microscopic or macroscopic a) moisture particles or droplets and/or b) substances in gaseous state. "Volatilization" or "volatized" means herein a change of state from forming part of a bulk liquid to vapor.

In another aspect, control of deposit build up at the exhaust valve also is achievable when the organomolybdenum source obtained from the engine lubricant in the fuel/air or gas streams fed to the combustion chamber, and any combustion products thereof, are exhausted from the combustion chamber via the exhaust valve.

In several embodiments, the vapors of organomolybdenum and/or fine oil droplets in the crankcase vapor phase containing the organomolybdenum source are entrained into PCV gases fed, and/or EGR gases recirculated, into the intake manifold of a combustion engine. In these ways, for example, vapors of the organomolybdenum source are brought into contacting relationship with a) the components of the fuel/air mix or air alone being fed from the intake manifold through and in contacting relationship with the intake valve into the combustion chamber, as well as with b) combustion products generated in the combustion chamber that also can contact portions of the intake valve and the exhaust valve.

As used herein, "contacting" means the contacting, bringing together, reacting, complexing, coordinating, combining, admixing, mixing, and the like association between two or more materials, whether or not a chemical or physical reaction or change occurs.

In yet another embodiment, the lubricant containing the organomolybdenum source is used as a valve seat recession additive providing solid lubrication to the exhaust valves of the combustion chambers.

It is to be understood that both the foregoing general description and the following detailed description and figure referenced therein are exemplary and explanatory only and are intended to provide further explanation of the present invention, as claimed.

BRIEF DESCRIPTION OF DRAWING

The sole figure depicts an engine, in cross section, upon which the method of an embodiment is implemented in one non-limiting illustration.

DETAILED DESCRIPTION

Embodiments of the present invention may comprise a method for advantageously using a vapor phase component of an engine lubricant, such as a crankcase oil, to induce beneficial effects in the engine's combustion system, such as a reduction in the formation of intake and exhaust valve deposits. In an embodiment, portions of an organomolybdenum source component of the engine lubricant may be entrained via the crankcase vapor phase into the intake air fed through an intake valve into a combustion chamber of the engine. Embodiments may also relate to combustion systems upon which the methods described herein can be practiced.

It surprisingly has been discovered that the delivery, inclusion and presence of such portions of an organomolybdenum source component into the vapor phase from the engine lubricant in the fuel/air mixture or air fed to the combustion chamber results in a pronounced reduction in build up of deposits in the intake manifold in general and of intake valve deposits (IVD) in particular. The reduction of intake manifold deposits and/or IVD achieved means a cleaner engine, and improved engine performance is attainable in terms of gas mileage, power, and/or durability.

Although not desiring to be bound to any particular theory at this time, it is thought, among other possible mechanisms, that the organomolybdenum source entrained into the lubricant vapor phase from the engine lubricant causes or induces a reduction in the valve-deposit forming reactive organic precursors that otherwise would be formed and present in the vapor phase above the crankcase oil. A reduction in the build up of valve deposits at the exhaust valve of the combustion chamber also is achievable as attributable to the portions of an organomolybdenum source component entrained into the lubricant vapor phase, which is obtained from the liquid phase of the engine lubricant, into the fuel/air mixture or air fed to the combustion chamber and combustion products thereof.

Some embodiments are applicable to MPI, DIG, or PFI engines, in which a fuel/air mixture containing the organomolybdenum source can be entrained into the vapor phase of an engine crankcase, from which it can be fed into an intake manifold and/or through an intake valve of a combustion engine. Some embodiments are applicable to DIG engines in which fuel is injected inside the combustion chamber and air containing the organomolybdenum source, which can be entrained into the vapor phase from which it can be fed through an intake valve. Significant IVD reductions have been demonstrated in particular where the engine lubricant containing the organomolybdenum source entrained into the vapor phase has as a major component a base oil that is a partial synthetic heavy duty diesel (HDD) oil, as shown in the examples described below.

Molybdenum Delivery Routes

In one non-limiting embodiment, the organomolybdenum source contained in the lubricant will have a vapor pressure under crankcase conditions during engine operation effective that sufficient amounts thereof will volatize into the vapor phase and be entrained by techniques described herein into the air stream fed to the intake valve of the combustion chamber effective to control IVD, as compared to the same scenario with the molybdenum ingredient being included in the engine lubricant. Alternatively, or in combination with the above mechanism, dynamic contact between the lubricant and internal surfaces of the crankcase and parts thereof or with moving mechanical parts within the crankcase can be energetic enough relative to the lubricant composition to cause fine liquid droplets of the oil containing the organomolybdenum source to separate from the bulk oil phase and become dispersed in the vapor phase, where it is available to be entrained by blow-by gases that are carried into the crankcase ventilation system, and so forth, as described in more detail below.

Referring to the sole figure, a typical engine lubrication system has an oil pump (not shown) that draws oil 10 from the oil pan 12, then forces it through the oil filter (not shown), into the crankshaft passage, through the connecting rods 14 to the pistons 16 and rings. Oil is pushed through the lifters 18 and pushrods 20, and covers the rocker arms 22. The oil then flows back down into the pan 12 to complete the cycle.

As will be understood by a person familiar with the art, a variety of pathways are provided within the engine for motor oil to move and flow through major components of the engine. For instance, oil passages may be drilled into the connecting parts of the engine, which permits highly mobile components, like the pistons, to receive ample lubrication. In the case of pistons and rods, the passages are usually designed to open each time the holes in the crankshaft and rods align. Oil seals (not shown) can be used, including of a conventional variety, which are generally mounted at the end of shafts to keep fluids, such as oil, transmission fluid, and power steering fluid inside the object. These seals flex to hold a tight fit around the shaft that comes out the housing, and prevents fluid to pass. Other common components of an internal combustion engine can be implemented, such as a fuel injector, an oil filter, an oil pump, a fuel pump, a timing chain, main bearings, the flywheel, belts, oil seals, and so forth, also are not shown to simplify this illustration. These devices generally can have a conventional design and function when used in engines operated by a method according to the present embodiments.

In some embodiments, an objective achieved is the delivery of an organomolybdenum source from the vapor phase of the engine lubricant to the intake valve in amount, rate and manner effective to reduce IVD formation at the intake valve over a period of engine running time, as compared to the same engine set up and operation except that the molybdenum source is not included in the engine lubricant. The figure includes a representative, non-limiting illustration of an intake valve 24 through which the fuel/air mix, or alternatively, air, containing the entrained molybdenum source is fed from the intake manifold 36. The intake valve 36 is seated at a seat 26, and the intake valve stem 28 and valve spring 30 are also depicted. At the emissions side of the combustion chamber, an exhaust manifold 38 is fed via an exhaust valve 32 seated at a seat 34. The figure also shows the cylinder head 42, crankshaft 46, block 44, and coolant 48.

With this contextual information in mind, exemplary, non-limiting, techniques for achieving delivery of portions of an organomolybdenum source component of the engine lubricant entrained into the vapor phase into the intake air fed through an intake valve of a combustion chamber of the engine will now be described in more detail.

In addition to catalytic converter and evaporative emission systems, positive crankcase ventilation (PCV) and EGR systems are also commonly included in a vehicle's emission control system to improve engine performance and reduce air pollution. An engine cylinder can not be sealed perfectly. For instance, a portion of the combustion gases leak through a small gap between the rings and the cylinder wall and enter into the crankcase. Consequently, crankcases in reciprocating engines have to be ventilated, because these gases from the combustion chamber flow past the piston rings into the crankcase. These escaped gases often are referred to as "blow-by gases." In addition, periodic volume changes in the crankcase caused by the kinematics of the crank mechanism, must also be compensated. The piston movement produces high gas velocities inside the crankcase. Fine oil droplets are entrained by the gas, thus penetrating into the crankcase ventilation system.

A PCV system is used to recycle these blow-by gases back into the cylinder for reburning them. For example, when the engine is running, an intake manifold vacuum is supplied to the PCV valve. This vacuum moves air through the clean air hose into the rocker arm cover. From this location, air flows through cylinder head openings into the crankcase where it mixes with blow-by gases that escape from the combustion chamber past the piston rings. The mixture of blow-by gases and air flows up through cylinder head openings to the rocker arm cover and the PCV valve. The intake manifold vacuum moves the blow-by gas mixture through the PCV valve into the intake manifold. The blow-by gases are then moved through the intake valves into the combustion chambers where they are burned. The engine can be designed such that the intake manifold vacuum experienced during idle, deceleration, part throttle, high engine load, and backfire engine conditions has effects on the PCV valve position that are known and implemented in conventional combustion engine technology. Moreover, the above-described configuration of a PCV system generally can be implemented in any manner generally known for such systems in combustion engine technology. The above general scheme of the operation of a PCV system thus can improve gas mileage and reduce harmful gas and sludge formation in the engine.

However, the PCV system also will tend to draw oil vapors from the crankcase and introduce them additionally into the intake air to be burned. Although prior thinking was that the latter phenomenon was undesirable, the present embodiments exploit it as a delivery mechanism to introduce a beneficial additive, namely, the organomolybdenum source entrained into the vapor phase in an embodiment of this invention, from the vapor phase of the oil into air-containing feed stream fed through an intake valve to the combustion chamber effective to reduce build up and/or rate of build up of intake valve deposits (IVD).

In another alternative or additive embodiment, the organomolybdenum source can be brought from the vapor phase of the crankcase oil into an air-containing stream being fed through the intake valve of the combustion chamber effective to reduce IVD via the EGR system. The EGR system prevents the formation of the harmful nitrogen oxides ($NO_x$). To reduce $NO_x$ production in the combustion chamber, which is more likely to occur at higher temperatures, the EGR is used to lower the combustion chamber temperature. The EGR accomplishes this by recirculating a certain amount of the exhaust gases back into the combustion chamber and dilutes the fuel mixture.

For example, a port exhaust EGR valve can contain a diaphragm with a sealed vacuum chamber above the diaphragm. A vacuum outlet from this chamber is connected to control vacuum. A stem extends from the diaphragm to a tapered valve in the lower part of the EGR valve. A spring above the diaphragm forces it downward and seats the tapered valve on a matching seat in the lower valve body. A passage is connected from the exhaust manifold to the tapered valve and seat. A passage is connected from the top of the tapered valve to the intake manifold. A vacuum is supplied to the EGR valve diaphragm chamber through a solenoid controlled by the power-train control module (PCM). When vacuum is supplied to the diaphragm chamber, the diaphragm, stem, and valve are lifted upward, which allows some exhaust gas to recirculate from the exhaust manifold into the intake manifold. That is, an EGR valve directs the exhaust gases from the crossover passage into the intake manifold. An EGR system typically includes a temperature valve on the radiator, sometimes with a delay timer and a vacuum amplifier. Since the recirculated exhaust gas contains very little oxygen, it does not burn in the combustion chambers, and combustion temperature is reduced. This results in decreased emissions of nitrogen oxides. Positive backpressure EGR valves, negative backpressure EGR valves, linear EGR valves, or EGR valves with exhaust gas temperature sensors also could be used. The above-described EGR system features can be implemented in any manner generally known for such EGR components and systems in combustion engine technology.

However, the EGR system also will tend to draw oil vapors from the crankcase and introduce them in combination with the recirculated exhaust gas into the intake air to be burned. Although prior thinking also was that the latter phenomenon was undesirable, the present embodiments exploit it as a delivery mechanism to introduce the beneficial molybdenum source from the vapor phase of the oil into the air-containing feed stream fed through the intake valve of a combustion chamber to reduce build up of intake valve deposits (IVD).

It will be appreciated that above-illustrated routes of introduction of the entrained vapors of the organomolybdenum source, or a vapor-mist of fine oil droplets containing same, into the combustion chamber from the crankcase lubricant are exemplary and non-limiting. Other routes of introduction of the molybdenum source into the combustion chamber include, for example, via backflow from the combustion chamber to the intake system, as an EGR mechanism caused by valve overlap timing. The introduction also can occur by oil flow past the intake-valve seats, leading down the stem to the surface where deposits form, which normally would be considered as strictly detrimental.

The implementation and application of the principles of these embodiments may be applied to reducing IVD at the intake valve of every cylinder of the engine, although a lesser number of cylinders could be so treated. In one embodiment, the crankcase may have closed crankcase ventilation. It is not necessary that it be vented through a filler cap. In such an embodiment, there may be an increase in the level of entrained organomolybdenum source available in the vapor phase of the engine lubricant for entrainment into the air stream fed to the intake valve(s). It also is not necessary that oil separator be included in the crankcase ventilation system that eliminates essentially all or 100% of any oil droplets entrained into the vapor phase.

Since different chemical types of organomolybdenum sources can have different vapor pressures, and different oils can have different surface tensions and other properties which can effect its susceptibility to splashing droplets, under crankcase temperature and pressure conditions, and the susceptibility of the lubricant to ejecting or splashing fine droplets into the vapor phase is affected by the magnitudes and types of mechanical forces disturbing the oil as well as the overall composition of the oil, then it will be appreciated that the breakdown between the respective amounts of entrained volatized organomolybdenum source and that entrained via fine oil droplets into the vapor phase can vary depending on the conditions. The engine, crankcase, and crankcase components may be operated under conditions, e.g., temperature, pressure, and dynamic mechanical conditions, in which an effective amount of the organomolybdenum source present in the lubricant liquid phase as an oil-soluble additive can be transferred and introduced into the vapor phase of the lubricant in the crankcase by at least one of the mechanisms described herein to be available for delivery to the intake manifold in the vapor phase.

The term "air", as used herein, is not limited to atmospheric air alone, but is intended to more generally encompass any one or combination of gases drawn from atmospheric air, gases drawn from the crankcase by the PCV system, and/or gases recirculated by the EGR system. Other additives commonly used in engine lubricants may also be included as needed to the extent they do not significantly hinder or interfere with the ability to get the organomolybdenum source vaporized and/or entrained via small oil droplets into the vapor phase, and IVD-reducing effect, of the organomolybdenum source component.

Engine Lubricating Oil Composition

The engine lubricant may include at least a major amount comprising a base oil of lubricating viscosity and the organomolybdenum source. Under normal engine conditions, the bulk of the engine lubricant will remain in flowable liquid form.

The organomolybdenum source compounds may comprise oil-soluble compounds and/or fuel-soluble materials. The organomolybdenum compositions may be "oil soluble" in the sense that they are oil-soluble or capable of being solubilized under normal blending or use conditions into a lubrication oil or diluent for the concentrate. As indicated above, in one non-limiting embodiment, the organomolybdenum source may have a vapor pressure under crankcase conditions during engine operation that may generate a volatized fraction thereof sufficient to support IVD build up reduction or prevention when a portion or all of the volatized fraction is entrained into the fuel/air mix or other gas stream fed through the intake valve into the combustion chamber of the engine.

By "organomolybdenum source" herein is meant any organomolybdenum compound, source, complex, salt, derivative, whether a charged or uncharged material, having the above-indicated functional attributes. Such organomolybdenum materials may include, for example, but are not limited to, mono-nuclear and di-nuclear and tri-nuclear molybdenum sulfonate, molybdenum phenate, molybdenum salicylate, molybdenum carboxylates, molybdenum dithiocarbamates, neutral and overbased molybdenum salicylates, neutral and overbased molybdenum phenates, neutral and overbased molybdenum sulfonates, ammonium molybdate, sodium molybdate, potassium molybdate, and molybdenum halides, compounds derived from molybdenum reacted with amines and alcohols, and combinations and mixtures thereof. In one embodiment, the organomolybdenum source comprises an organomolybdenum complex prepared by reacting fatty oil, diethanolamine, and a molybdenum source. Other suitable molybdenum sources include molybdenum complexes described in U.S. Pat. Nos. 6,509,303; 6,528,461; and 6,528,463, which teachings are incorporated herein by reference. They can be derived, for example, from carboxylic acids, carboxylic acid amides, or fatty acid amides such as those described in U.S. Pat. Nos. 6,174,842; 3,578,690; 4,765,918; 4,889,647; and 5,137,647, which teachings are incorporated herein by reference.

Examples of commercial organomolybdenum dialkyldithiocarbamates that may be used in the present invention include Molyvan® 807 and Molyvan® 822, available from the R. T. Vanderbilt Company, Inc., and Sakura-Lube 100, Sakura-Lube 155, Sakura-Lube 165 and Sakura-Lube 600, available from Asahi Denka Kogyo K.K. Examples of commercial sulfur- and phosphorus-free oil soluble molybdenum compounds or complexes are Sakura-Lube 700 from Asahi Denka Kogyo K.K.; and Molyvan® 856B and Molyvang 855 from R. T. Vanderbilt Company, Inc. Examples of commercial molybdenum carboxylate compounds derived from carboxylic acids that may be used in the present invention include, for example and without limitation herein, 15% Molybdenum HEX-CEM, available from OM Group, Inc., Molybdenyl Naphthenate 6% and Molybdenum Octoate 8%, available from the Shepherd Chemical Company. Examples of other useful commercial oil soluble organomolybdenum compounds are Sakura-Lube 180 from Asahi Denka Kogyo K.K.; Molyvan® A from R. T. Vanderbilt Company; and Naugalube MolyFM from Crompton Corporation.

The amount of molybdenum added to the lubricating oil to produce the finished crankcase oil and provide the IVD reduction effect may vary depending upon other additional customers' requirements and the specific application for which the molybdenum compound may also impart beneficial effects from the liquid phase of the lubricant. IVD reduction from the vapor phase is an unexpected bonus to the benefits of the organomolybdenum source imparted from the liquid phase of the engine lubricant.

Treat levels of organomolybdenum source in an engine lubricant, such as crankcase oil, to meet all these requirements may vary generally from about 0.002 wt % (20 ppm) to about 3.0 wt % (30000 ppm), and more particularly may vary between about 0.0025 wt % (25 ppm) to about 1500 ppm (0.15 wt %). The concentration of organomolybdenum source in the lubricants according to embodiments has no particular upper practical limit, however, for economic reasons a maximum level of active Mo may be about 4000 ppm, although not required.

The organomolybdenum source additive of this invention can be employed in a variety of lubricating oil base stocks, such as derived from natural lubricating oils, synthetic lubricating oils or mixtures thereof. These oils include typical crankcase lubrication oils for spark-ignited and compression-ignited internal combustion engines, for example gasoline fired engines; sequential MPI engines; DGI engines; throttle engines; natural gas engines; and diesel engines.

These oil base stocks can include, for example, hydrocracked base oils; mineral oils such as paraffinic, naphthenic or mixtures thereof; vegetable oils; petroleum oils, oils derived from coal shale; silicon-based oils; halosubstituted hydrocarbon oils; esters of dicarboxylic acids with alcohols; wax isomerate oils; polyalphaolefins; and mixtures thereof. In one non-limiting embodiment, the base oils used in forming the lubricating compositions of the present invention are characterized by the presence of a high level of saturates and a very low level of sulfur, and include base oils referred to in the petroleum additive industry as Group II and Group III base oils. Further details on such base oils are described, for example, in U.S. Pat. No. 5,840,672, which teachings are incorporated herein by reference. In one non-limiting illustration, the base oils generally contain greater than or equal to about 90% saturates, less than or equal to about 0.03 weight percent sulfur and have a viscosity index of greater than or equal to about 80. The base oil typically has a viscosity generally of about 2 to about 15 cSt at 100° C.

In one non-limiting embodiment, the lubricant oil can be a formulated oil comprising between about 75 to about 95 weight percent (wt %) of a base oil of lubricating viscosity, between about 0 and about 30 wt % of a polymeric viscosity index improver, between about 5 and about 15 wt % of an additional additive package and typically a sufficient amount of molybdenum complex to provide at least about 50 ppm of molybdenum to the finished lubricant. The optional supplemental additives, for example, could be a supplemental detergent/inhibitor additive package and/or viscosity index improver. Embodiments may also encompass the improved lubricating oil compositions, which contain the organomolybdenum additives of the present disclosure.

When formulated into an engine lubricating oil, the oil-soluble, organomolybdenum additives optionally can be used in combination therein with one or more other additives including those typically used in lubrication oils. Typical additives used in lubrication oils, which optionally can be used in this respect, include detergents, corrosion inhibitors, rust inhibitors, additional antioxidants, dispersants, foam inhibitors, additional antiwear agents, additional friction modifiers, demulsifiers, VI improvers, pour point depressants, zinc dialkyldithiophopshates (ZDDP), and so forth. Examples of such optional supplemental additives are described, for example, in U.S. Pat. No. 5,840,672, which teachings are incorporated herein by reference. The overall composition of a lubricating oil including the organomolybdenum additive such as described herein can vary significantly based on the customer and specific application.

It should also be understood that the IVD deposit forming substances being reduced or eliminated from building up at the intake valve according to the present embodiments by the entrained organomolybdenum source delivered from the lubricant can originate from the air utilized in the combustion of the hydrocarbonaceous fuel. In an embodiment, the IVD deposit forming substances being reduced or eliminated from building up at the intake valve by the organomolybdenum source can originate from the hydrocarbonaceous fuel. In another embodiment, the IVD deposit forming substances being reduced or eliminated from building up at the intake valve by the organomolybdenum source can originate from the lubricant used to lubricate the combustion system. While not desiring to be bound at this time, it is believed possible that the vapors of organomolybdenum source material or fine droplets of oil containing it obtained from the lubricant finely disperse in the feed streams fed through the intake valve effective to either hinder or prevent potential IVD forming substances from forming deposits on, or from being retained on the intake valve as deposits, and/or to condition the intake valve to be a less receptive substrate to such deposit-forming substances. It is also possible that the entrained organomolybdenum source material can reduce the amount of previously formed deposits present on the intake valve.

The organomolybdenum additives of the present invention can be used in lubricating oils such as crankcase oils for internal combustion engines, as well as gear lubricants, hydraulic fluids, automatic transmission fluids, turbine lubricants, engine fuels, compressor oils, lubricating greases, and so forth. The lubricating oil compositions of this invention can be made by adding the organomolybdenum compositions, and any supplemental additives, to an oil of lubricating viscosity. The method or order of component addition is not critical. Alternatively, the molybdenum compositions, along with any additional additives, can be added to the oil as a concentrate.

Some embodiments are applicable to a DIG engine in which combustible hydrocarbonaceous fuel is sprayed directly into the engine cylinder using a fuel injector. In particular, the fuel injector can be placed in the combustion chamber of a DIG engine between the air intake and the exhaust valves. In this arrangement, deposit control can not be accomplished through the fuel per se. However, as described herein, the organomolybdenum source material sourced from the engine lubricant can be introduced via the vapor phase into the combustion chamber effective to control valve deposits.

The entire disclosure of all applications, patents, and publications, cited above or below, are hereby incorporated by reference.

EXAMPLES

Examples below investigated and demonstrate the reduced intake valve deposit (IVD) performance achieved by delivery of an organomolybdenum source from the vapor phase of an engine lubricant according to an embodiment of the present invention.

Testing protocol according to ASTM D-6201 was used for this investigation. The test engine was a 2.3 L Ford gasoline engine. Two different motor oils were used in different runs. Motorcraft SAE 5W-30 (API Service SH Grade) Super Premium Motor Oil, an industry-standard test oil, was used in runs 1-3, which are summarized in Table 1. Motorcraft SAE 1 5W40 Heavy Duty Diesel Motor Oil was the baseline oil used in the other runs. A diesel motor oil was used to accentuate the effect. The organomolydenum source added to several but not all of the runs was Molyvan® 855, manufactured by R. T. Vanderbilt. The treat rate of the lubricant with the molybdenum source was 0.15 wt % based on the total weight of the lubricant composition. An antioxidant additive also was included in some, but not all, of the test runs conducted. Hi-TEC® 4975(A), obtained from Ethyl Corporation, Richmond, Va., was the commercial source used for this antioxidant additive. In Table 1 below, the amount of antioxidant additive treatment is indicated in units of pound per thousand barrels (PTB).

The results are set forth in Table 1 below.

TABLE 1

| Test Run | Additive (PTB) | Oil | Moly Source Amt. (wt %) | IVD (mg) | CCD (mg) |
|---|---|---|---|---|---|
| 1 | 0 | SAE 5W30 | 0 | 389 | 1409 |
| 2 | 72 | SAE 5W30 | 0 | 124 | 1673 |
| 3 | 72 | SAE 5W30 | 0.15 | 118 | 1687 |
| 4 | 72 | SAE 15W40 | 0 | 194 | 1813 |
| 5 | 72 | SAE 15W40 | 0.15 | 89 | 1830 |

These results clearly demonstrate that the inclusion of the molybdenum source in the liquid engine lubricant in Test Runs 3 and 5, which was entrained into the vapor phase, resulted in a reduction of intake valve deposits in the combustion engine. The IVD results reported for these tests are accurate within +/−15 mg, while CCD repeated to about +/−65. Therefore, it also was concluded that the change in oil led to increased CCD, with or without molybdenum. It also caused an increase in IVD as well, but only if the molybdenum additive was not present.

In yet another embodiment, the lubricant containing the organomolybdenum source can be used as a valve seat recession additive providing solid lubrication to the exhaust valves of the combustion chambers as well as control of (reduce or prevent) valve deposit build up at the exhaust valve.

Other embodiments will be apparent to those skilled in the art from consideration of the specification, Figure and practice of the invention disclosed herein. It is intended that the specification and Figure be considered as exemplary only, with a true scope and spirit of the invention being indicated by the following claims.

What is claimed is:

1. A method for reducing deposits in a combustion engine having a combustion chamber operable to combust fuel and air mixtures therein, and an intake manifold including an intake valve operable to introduce at least air into the chamber and an exhaust valve operable to release combustion products from the chamber, comprising:

introducing an organomolybdenum source into the vapor phase within an engine from a liquid phase of a lubricating oil in a crankcase of an internal combustion engine, and delivering the organomolybdenum source from the vapor phase into the combustion chamber through an intake manifold including an intake valve in a manner effective to reduce the formation of deposits in the intake manifold, as compared to using the lubricating oil without the organomolybdenum source.

2. The method of claim 1, wherein the delivery of the organomolybdenum source comprises at least one of entraining volatized vapors comprising the organomolybdenum source from the lubricating oil into gases fed into the combustion chamber, and entraining fine oil droplets in the crankcase vapor phase containing the organomolybdenum source into gases fed into the combustion chamber, or a combination thereof.

3. The method of claim 1, wherein the reduced formation of engine deposits occurs at the intake valve.

4. The method of claim 1, further comprising combusting a hydrocarbonaceous fuel introduced into the combustion chamber in the presence of the vapors of the organomolybdenum source, and exhausting combustion products thereof out of the combustion chamber via the exhaust valve, wherein formation of valve deposits at the exhaust valve is reduced.

5. The method of claim 1, wherein the delivery of the organomolybdenum source comprises entraining at least one of vapors of volatized organomolybdenum source from the lubricating oil, and fine oil droplets in the crankcase vapor phase containing the organomolybdenum source, into crankcase gases fed to an intake manifold via a positive crankcase ventilation (PCV) system for introduction through the intake manifold and intake valve.

6. The method of claim 1, wherein the delivery of the organomolybdenum source comprises recirculating combustion products containing said organomolybdenum source or combustion products thereof in the combustion chamber into an intake manifold feeding said recirculated combustion products containing said organomolybdenum source or combustion products thereof through the intake manifold and intake valve back into the combustion chamber.

7. The method of claim 1, wherein the delivery of the organomolybdenum source comprises recirculating combustion products containing said organomolybdenum source or combustion products thereof in the combustion chamber by an exhaust gas recirculation (EGR) system into an intake manifold feeding said recirculated combustion products containing said organomolybdenum source or combustion products thereof through the intake valve back into the combustion chamber.

8. The method of claim 1, wherein the organomolybdenum source in the lubricating oil is selected from the group consisting of molybdenum sulfonates, molybdenum phenates, molybdenum salicylates, molybdenum carboxylates, mono-nuclear and di-nuclear and tn-nuclear molybdenum dithiocarbamates, neutral and overbased molybdenum salicylates, overbased molybdenum phenates, overbased molybdenum sulfonates, ammonium molybdate, sodium molybdate and potassium molybdate, and molybdenum halides, compounds derived from molybdenum reacted with amines and alcohols, and combinations, mixtures, or derivatives thereof.

9. The method of claim 1, wherein the organomolybdenum source is present in the lubricating oil in an amount sufficient to provide at least about 20 ppm molybdenum to the lubricating oil.

10. The method of claim 1, wherein the organomolybdenum source is present in the lubricating oil in an amount sufficient to provide about 20 ppm to about 4000 ppm molybdenum to the lubricating oil.

11. The method of claim 1, wherein the lubricating oil comprising a major amount of a base oil of lubricating viscosity.

12. The method of claim 1, wherein the lubricating oil comprising a major amount of a base oil of lubricating viscosity, wherein the base oil contains less than or equal to 0.03 wt % sulfur, and greater than or equal to 90 wt % saturates, and has a viscosity index greater than or equal to 80.

13. The method of claim 1, wherein the combustion engine is selected from the group consisting of a multiport engine, a sequential multiport engine, a direct injection gasoline engine, and a port-fuel injection engine.

14. The method of claim 1, wherein the combustion engine is selected from the group consisting of a gasoline fuel engine, a diesel fuel engine, a diesel-electric hybrid engine, a gasoline-electric hybrid engine, a fuel-oil combustion engine, a gasohol engine, and a jet fuel engine.

15. An apparatus for performing the method of claim 1, said apparatus comprising
(a) a combustion chamber adapted to combust a hydrocarbonaceous fuel;
(b) a crankcase adapted to hold and circulate lubricant, and said crankcase operably associated with the combustion chamber, wherein said lubricant comprises base oil and an oil-soluble, organomolybdenum source;
(c) fuel introduction means adapted introduce hydrocarbonaceous fuel into the combustion chamber;
(d) an intake manifold including an intake valve adapted to introduce at least air into the combustion chamber; and
(e) an exhaust valve for discharging combustion products from the combustion chamber.

16. The apparatus of claim 15, further comprising combining means for combining portions of the organomolybdenum source introduced and dispersed in a vapor phase within the crankcase with the air to be introduced into the combustion chamber via the intake manifold.

17. The apparatus of claim 16, wherein the combining means comprises a positive crankcase ventilation (PCV) system.

18. The apparatus of claim 16, wherein the combining means comprises an exhaust gas recirculation (EGR) system.

19. The apparatus of claim 15, wherein the fuel introducing means and the intake valve are the same.

20. The apparatus of claim 15, wherein the fuel introducing means being adapted to inject fuel directly into the combustion chamber between the intake and exhaust valves.

21. The apparatus of claim 15, wherein the combustion engine is selected from the group consisting of a multiport engine, a sequential multiport engine, a direct injection gasoline engine, and a port-fuel injection engine.

22. The apparatus of claim 15, wherein the combustion engine is selected from the group consisting of a gasoline fuel engine, a diesel fuel engine, a diesel-electric hybrid engine, a gasoline-electric hybrid engine, a fuel-oil combustion engine, a gasohol engine, and a jet fuel engine.

* * * * *